(12) United States Patent
Wang et al.

(10) Patent No.: US 9,423,510 B2
(45) Date of Patent: Aug. 23, 2016

(54) SCINTILLATION DETECTOR FOR IMPROVED PET PERFORMANCE

(71) Applicant: Toshiba Medical Systems Corporation, Otawara-shi (JP)

(72) Inventors: Jerry Yanqi Wang, Lake Zurich, IL (US); Kent C. Burr, Buffalo Grove, IL (US)

(73) Assignee: TOSHIBA MEDICAL SYSTEMS CORPORATION, Otawara-shi (JP)

( * ) Notice: Subject to any disclaimer, the term of this patent is extended or adjusted under 35 U.S.C. 154(b) by 0 days.

(21) Appl. No.: 14/278,912

(22) Filed: May 15, 2014

(65) Prior Publication Data

US 2015/0331119 A1    Nov. 19, 2015

(51) Int. Cl.
| | |
|---|---|
| *G01T 1/29* | (2006.01) |
| *G01T 1/161* | (2006.01) |
| *G01T 1/164* | (2006.01) |
| *G01T 1/208* | (2006.01) |

(52) U.S. Cl.
CPC ............. *G01T 1/161* (2013.01); *G01T 1/164* (2013.01); *G01T 1/1642* (2013.01); *G01T 1/1644* (2013.01); *G01T 1/208* (2013.01); *G01T 1/29* (2013.01); *G01T 1/2985* (2013.01)

(58) Field of Classification Search
CPC ......... G01T 1/202; G01T 1/1644; G01T 1/20; A61B 6/037
USPC .................................................... 250/363.03
See application file for complete search history.

(56) References Cited

U.S. PATENT DOCUMENTS

| | | | | | |
|---|---|---|---|---|---|
| 5,012,103 | A | * | 4/1991 | Tanaka et al. | 250/368 |
| 5,208,460 | A | * | 5/1993 | Rougeot et al. | 250/368 |
| 5,241,180 | A | * | 8/1993 | Ishaque et al. | 250/361 R |
| 5,786,599 | A | * | 7/1998 | Rogers et al. | 250/483.1 |
| 5,861,628 | A | * | 1/1999 | Genna et al. | 250/368 |
| 6,516,044 | B1 | * | 2/2003 | Lyons | 378/19 |
| 7,531,817 | B2 | * | 5/2009 | Nagata et al. | 250/483.1 |
| 7,750,306 | B2 | * | 7/2010 | Menge et al. | 250/368 |
| 2004/0174951 | A1 | * | 9/2004 | Hoffman | 378/98.8 |
| 2007/0194242 | A1 | * | 8/2007 | Fiedler et al. | 250/370.11 |
| 2012/0061577 | A1 | * | 3/2012 | Oleinik et al. | 250/366 |
| 2013/0306876 | A1 | * | 11/2013 | Uchida | 250/366 |
| 2014/0224994 | A1 | * | 8/2014 | Speller | 250/362 |

* cited by examiner

*Primary Examiner* — Marcus Taningco
(74) *Attorney, Agent, or Firm* — Oblon, McClelland, Maier & Neustadt, L.L.P.

(57) ABSTRACT

A radiation detector for a radiation imaging system, wherein the detector comprises photosensors, arranged to receive light emitted from an array of scintillator elements. The scintillator elements absorb radiation, such as gamma rays, and emit light. Using Anger arithmetic and crystal decoding, the position of each scintillation event is determined from the relative fractions of light detected by each of the photosensors. Selectively shaping the top surface, i.e., the surface closest to the photosensors, of each scintillator element in the array, the direction of light emission from each scintillator element can be optimized such that the fraction of light detected by each photosensor is optimally distinct for each position in the array of scintillator elements. The top surface of at least one of the scintillator element array is not parallel with the bottom surface of at least one of the scintillator.

23 Claims, 7 Drawing Sheets

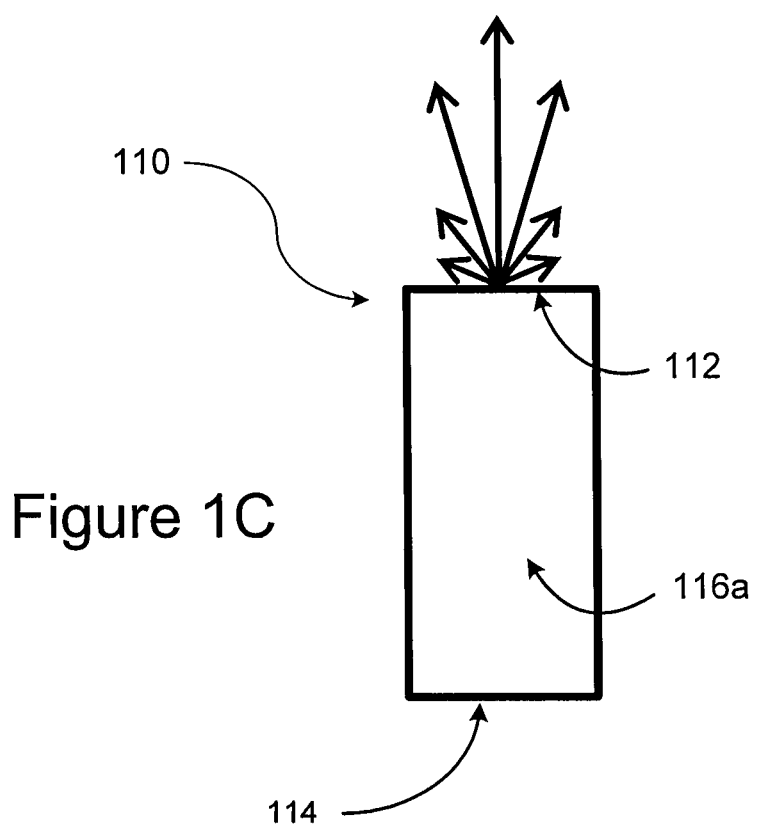

SCINTILLATION DETECTOR FOR IMPROVED PET PERFORMANCE

FIELD

Embodiments described herein relate generally to the design of radiation detectors, such as for gamma ray detection and positron emission tomography (PET).

BACKGROUND

In typical PET imaging, a radiopharmaceutical agent is introduced into an object to be imaged via injection, inhalation, or ingestion. After administration of the radiopharmaceutical, the physical and bio-molecular properties of the agent cause it to concentrate at specific locations in the human body. The actual spatial distribution of the agent, the intensity of the region of accumulation of the agent, and the kinetics of the process from administration to its eventual elimination are all factors that may have clinical significance. During this process, a positron emitter attached to the radiopharmaceutical agent will emit positrons according to the physical properties of the isotope, such as half-life, branching ratio, etc.

The radionuclide emits positrons, and when an emitted positron collides with an electron, an annihilation event occurs, wherein the positron and electron are combined. Most of the time, an annihilation event produces two gamma rays (at 511 keV) traveling at substantially 180 degrees apart.

By detecting the two gamma rays, and drawing a line between their locations, i.e., the line-of-response (LOR), one can determine the likely location of the original disintegration. While this process will only identify a line of possible interaction, by accumulating a large number of those lines, and through a tomographic reconstruction process, the original distribution can be estimated. In addition to the location of the two scintillation events, if accurate timing (within few hundred picoseconds) is available, a time-of-flight (TOF) calculation can add more information regarding the likely position of the event along the line. Limitations in the timing resolution of the scanner will determine the accuracy of the positioning along this line. Limitations in the determination of the location of the original scintillation events will determine the ultimate spatial resolution of the scanner, while the specific characteristics of the isotope (e.g., energy of the positron) will also contribute (via positron range and co-linearity of the two gamma rays) to the determination of the spatial resolution the specific agent.

The collection of a large number of events creates the necessary information for an image of an object to be estimated through tomographic reconstruction. Two detected events occurring at substantially the same time at corresponding detector elements form a line-of-response that can be histogrammed according to their geometric attributes to define projections, or sinograms to be reconstructed. Events can also be added to the image individually.

The fundamental element of the data collection and image reconstruction is therefore the LOR, which is the line traversing the system-patient aperture. Additional information can be obtained regarding the location of the event. First, it is known that, through sampling and reconstruction, the ability of the system to reconstruct or position a point is not space-invariant across the field of view, but is better in the center, slowly degrading toward the periphery. A point-spread-function (PSF) is typically used to characterize this behavior. Tools have been developed to incorporate the PSF into the reconstruction process. Second, the time-of-flight, or time differential between the arrival of the gamma ray on each detector involved in the detection of the pair, can be used to determine where along the LOR the event is more likely to have occurred.

The above described detection process must be repeated for a large number of annihilation events. While each imaging case must be analyzed to determine how many counts (i.e., paired events) are required to support the imaging task, current practice dictates that a typical 100-cm long, FDG (fluorodeoxyglucose) study will need to accumulate several hundred million counts. The time required to accumulate this number of counts is determined by the injected dose of the agent and the sensitivity and counting capacity of the scanner.

PET imaging systems use detectors positioned across from one another to detect the gamma rays emitting from the object. Typically a ring of detectors is used in order to detect gamma rays coming from each angle. Thus, a PET scanner is typically substantially cylindrical to be able to capture as much radiation as possible, which should be, by definition, isotropic. The use of partial rings and rotation of the detector to capture missing angles is also possible, but these approaches have severe consequences for the overall sensitivity of the scanner. In a cylindrical geometry, in which all gamma rays included in a plane have a chance to interact with the detector, an increase in the axial dimension has a very beneficial effect on the sensitivity or ability to capture the radiation. Thus, the best design is that of a sphere, in which all gamma rays have the opportunity to be detected. Of course, for application to humans, the spherical design would have to be very large and thus very expensive. Accordingly, a cylindrical geometry, with the axial extent of the detector being a variable, is realistically the starting point of the design of a modern PET scanner.

Once the overall geometry of the PET scanner is known, another challenge is to arrange as much scintillating material as possible in the gamma ray paths to stop and convert as many gamma rays as possible into light. In order to be able to reconstruct the spatio-temporal distribution of the radio-isotope via tomographic reconstruction principles, each detected event will need to be characterized for its energy (i.e., amount of light generated), its location, and its timing. Most modern PET scanners are composed of several thousand individual crystals, which are arranged in modules and are used to identify the position of the scintillation event. Typically scintillator elements have a cross section of roughly 4 mm×4 mm. Smaller or larger dimensions and non-square sections are also possible. The length or depth of the crystal will determine how likely the gamma ray will be captured, and typically ranges from 10 to 30 mm. One example of a scintillation crystal is LYSO (or $Lu_{1.8}Y_{0.2}SiO_5$:Ce or Lutetium Orthosilicate), which is chosen for its high light output, fast rise time, fast decay time, high average atomic number, and high density. Other crystals can be used.

PET imaging relies on the conversion of gamma rays into light through fast and bright scintillation crystals. After determining the interaction position in the scintillator and time pairing of individual events, the location of the annihilation process can be recreated. These actions require very fast components—detector and electronics—and they also require excellent signal to noise ratio. With high quality electronics, the signal to noise ratio is mainly determined by the inherent Poisson statistics involved in the detection process. Detecting more photons will result in improved signal-to-noise-ratio, and, therefore, better spatial and timing resolution. No improvement in detector design and electronics can compensate for significant loss of light in the detection process. The fraction of the total amount of light collected (relative to the amount created in the scintillator) is a good measure of the efficiency of the design. So to maximize the amount of light collected, one would try to get the light sensor as close as possible to the scintillation crystal and avoid reflections and other edge effects. This would then force the arrangement to be large array detector with short distance between crystal and sensor.

As described above, a PET imaging system is more than just a counter and, in addition to detecting the presence of a scintillation event, the system must identify its location. By properly documenting how light is being distributed to the multiple light sensors, it is possible to assign an event location for any given set of sensor responses. Light therefore needs to be distributed to multiple sensors.

Coordinates for the x-position and the y-position of a scintillation event are calculated using Anger arithmetic, wherein the x- and y-positions are determined by taking the ratios between the responses of neighboring sensors. Estimating positions from linear combinations of sensor signals leads to distortions, such as pincushion-like distortions. For crystal arrays the decoding of the crystal in which an interaction occurred is generally accomplished through the use of a lookup table generated from a flood map, with the distortions often making it difficult to unambiguously identify crystals in the corners or along edges, as can be seen in FIG. 2A.

FIG. 2A shows a drawing of a flood map, where the dots show the centroid of the detected light for each scintillator element in a module. When the centroids cluster together in the corners, the wings of the centroids statistical distributions overlap, creating ambiguity in the crystal decoding. This ambiguity in the crystal decoding ultimately limits the resolution of the PET imaging system. Poor crystal decoding degrades the PET imaging system performance by increasing the probability that a scintillation event will be assigned to the wrong scintillator element. The incorrect assignment of scintillation events to the wrong scintillator elements not only degrades spatial resolution, but it also degrades energy and timing resolution because different timing and energy corrections are applied to different scintillator elements. To improve crystal decoding the light sharing among the photosensors must be carefully controlled for each scintillator element, especially those in the edge regions.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1C is a side view of a scintillator element illustrating a notional radiation pattern for scintillation photons from a scintillator element;

DETAILED DESCRIPTION

According to one embodiment of the present invention, there is provided a radiation detector, such as a gamma ray detector, comprising: (1) a plurality of photosensors arranged to receive light emitted from a plurality of scintillator elements; and (2) the plurality of scintillator elements, wherein each of the plurality of scintillator elements has a bottom surface facing away from the plurality of photosensors, a top surface opposed to the bottom surface, and a plurality of lateral surfaces, wherein the top surface of at least one scintillator element of the plurality of the scintillator elements is not parallel with the bottom surface of the at least one scintillator element.

According to one embodiment of the present invention, there is provided a gamma ray detector comprising: (1) a plurality of photosensors arranged to receive light emitted from a scintillator module; (2) the scintillator module having a bottom surface facing away from the plurality of photosensors, and a top surface opposed to the bottom surface, wherein the top surface is not parallel with the bottom surface of said scintillator module.

According to one embodiment of the present invention, there is provided a radiation imaging system comprising: a plurality of radiation detectors arranged to receive radiation from an image source and circuitry configured to calculate the positions of each scintillation event detected by the plurality of scintillator detectors. Each radiation detector comprises: (1) a plurality of photosensors arranged to receive light emitted from a plurality of scintillator elements, and (2) the plurality of scintillator elements are arranged into a scintillator module, wherein each of the plurality of scintillator elements has a bottom surface facing away from the plurality of photosensors, a top surface opposed to the bottom surface, and a plurality of lateral surfaces. The top surface of at least one scintillator element of the plurality of the scintillator elements is not parallel with the bottom surface of the at least one scintillator element. The radiation imaging system further comprises circuitry configured to receive signals from the plurality of scintillator detectors and to calculate positions of radiation events using relative magnitudes and timing of the received signals.

Figure 1A:
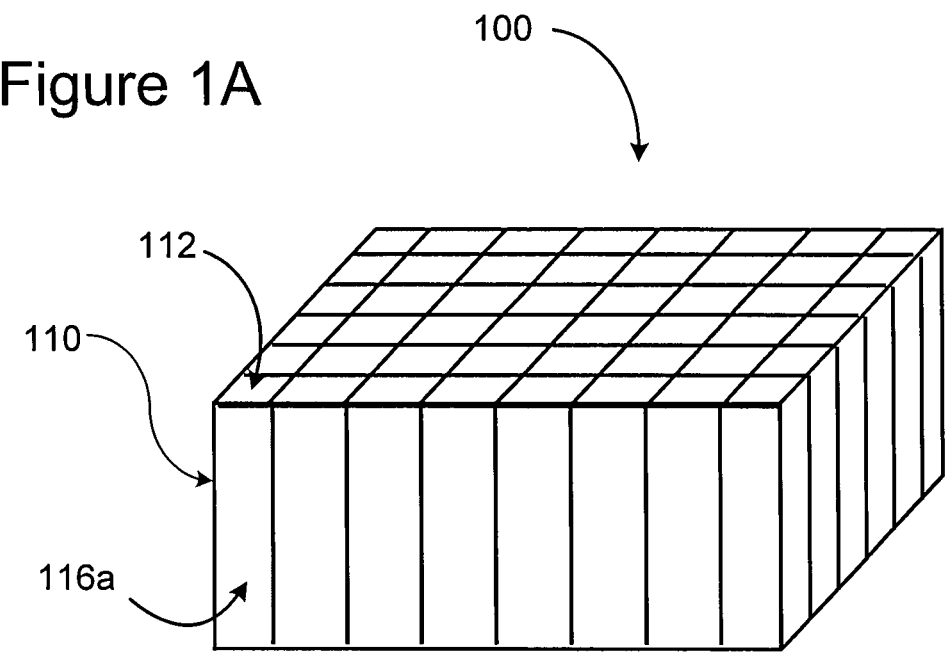
FIG. 1A shows a perspective view of a scintillator module with a two-dimensional array of scintillator elements.
Figure 1B:
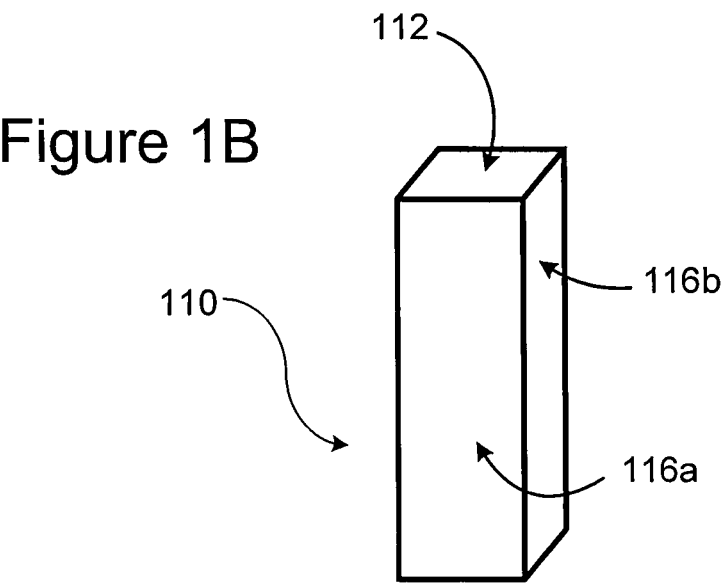
FIG. 1B shows a perspective view of a single scintillator element.
Figure 5:
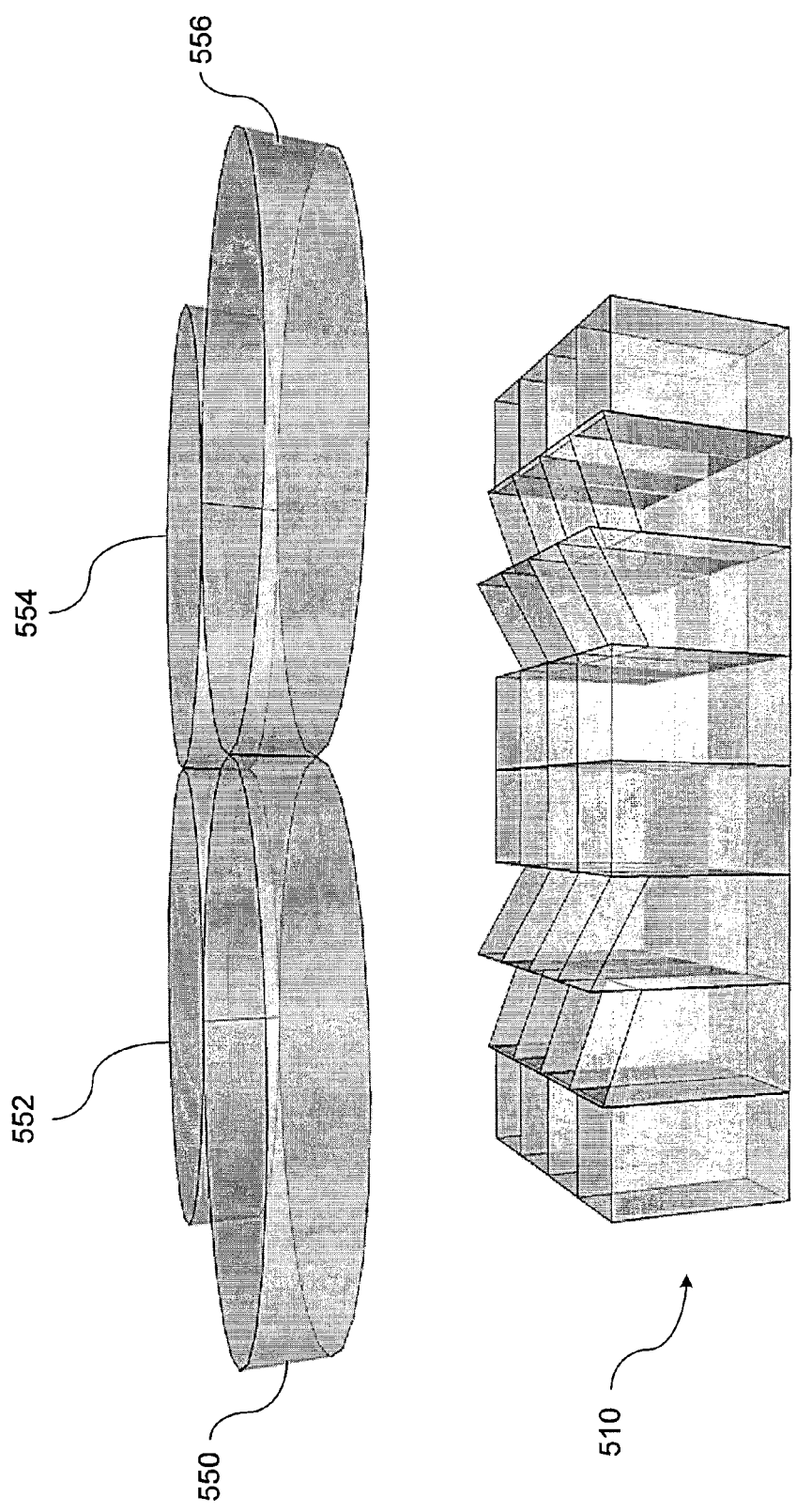
FIG. 5 illustrates a radiation detector with a two-dimensional array of scintillator elements with top surface shaping to improve crystal decoding, where the top surface of the scintillator module does not form a smooth continuous surface.

Referring now to the drawings, wherein like reference numerals designate identical or corresponding parts throughout the several views, FIG. 1A shows a prospective view of a scintillator module 100, wherein the scintillator module 100 includes a two-dimensional array of scintillator elements. Each scintillator element absorbs radiation and emits a percentage of the absorbed radiation energy as scintillation photons. The scintillator may be an inorganic or organic material with crystalline or amorphous structure. FIGS. 1B and 1C show respectively a prospective view and a side view of a scintillator element 110. A fraction of the emitted light is transmitted through the top surface of the scintillator module 100 and a fraction of the transmitted light is detected by photosensors located above the top surface of the scintillator module. The photosensors may be photomultiplier tubes, avalanche photodiodes, etc. FIG. 5, which is discussed later, provides additional perspective of the relative positions of the crystal module and the photosensors.

In a conventional detector module there is a single scintillator module and four photosensors. For each scintillator element certain photosensors will be closer and other photosensors will be farther away. A closer photosensor will typically subtend a larger solid angle relative to the scintillator element (especially where all of the photosensors have the same area), and therefore the closer photosensor collects a higher percentage of the light compared to more distant photosensors. Using Anger arithmetic, ratios between the photosensor are used to calculate the positions of scintillation events.

A two-step process is used to derive position data from the photosensor signals: (1) Anger arithmetic calculates the approximate x- and y-positions of a scintillation event, and (2) crystal decoding of the approximate position determines the exact scintillator element of the scintillation event. Crystal decoding is based on a lookup table generated from a flood map of the scintillator module. The flood map is a density plot of the Anger arithmetic positions for a larger number of scintillation events, where each peak (i.e., high density of scintillation events) on the flood map corresponds to a different scintillator element.

Figure 2A:
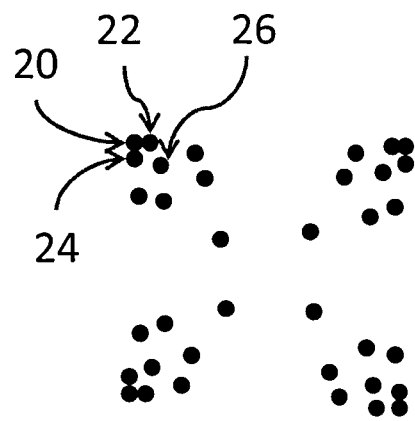
FIG. 2A illustrates a flood map for a scintillator module where no top surface shaping has been performed to improve crystal decoding by improving the centroid distribution across the flood map.
Figure 2B:
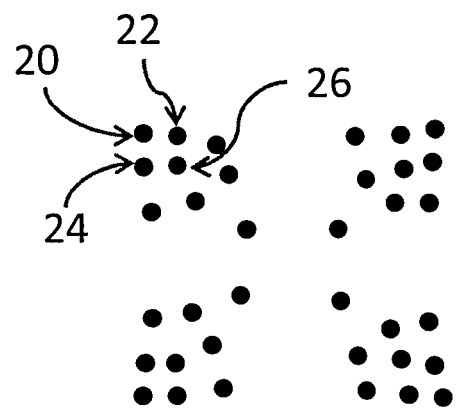
FIG. 2B illustrates a flood map for a scintillator module with moderate top surface shaping to improve crystal decoding.
Figure 2C:
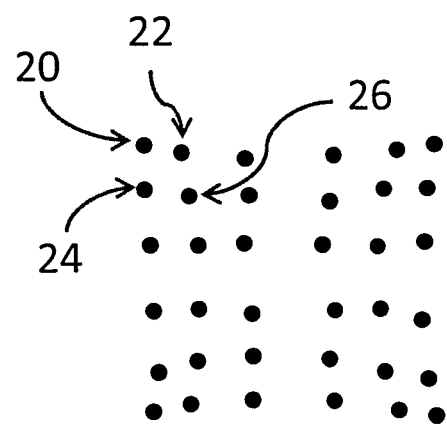
FIG. 2C illustrates a flood map for a scintillator module where extensive top surface shaping to improve crystal decoding.

FIGS. 2A, 2B, and 2C show examples of the representation of the positions of peak centroids in flood maps, where in contrast to a traditional flood map, which indicates density of events in a quasi-continuous scale, the flood maps in FIGS. 2A, 2B, and 2C have been simplified to show only the positions of the peak centroids. As can be seen in FIG. 2A, positions of peak centroids in flood maps of conventional scintillator modules exhibit significant distortions along the edges and especially in the corners. These distortions reveal a limitation arising from the flat uniform top surface common in a conventional scintillator module. As long as the flood map peaks do not bunch too closely together, the individual peaks can be resolved, and the distortions can be corrected using crystal decoding.

Crystal decoding is performed using a lookup table which is generated by defining boundaries between the flood map peaks and assigning the areas between boundaries to the respective scintillator elements. However, crystal decoding degrades when bunching due to flood map distortions causes individual peaks in the flood map to overlap and blend together. When the statistical distributions of neighboring peaks overlap, scintillation events will be assigned to incorrect scintillator elements. These incorrect assignments degrade the spatial, energy, and timing resolution.

All of these undesired effects (i.e., flood map bunching, incorrect crystal decoding assignments, and degraded resolution) result from the light emission pattern from the scintillator elements. The emission pattern is most intense for rays normal to the surface, and much lower intensity for rays approaching the grazing angle, as shown in FIGS. 1C and 3B.

Because the emission pattern is much weaker for angles far from normal, photosensors diametrically opposed to the edge scintillator elements, which are illuminated by these much weaker rays, measure weak signals, resulting in poor position discrimination. Fortunately, the emission patterns of the scintillator elements can be modified by shaping the top surface of the scintillator elements in order to obtain a flood map with evenly dispersed peaks, thus improving the crystal decoding and the spatial, energy, and timing resolution.

To understand how the shape of the top surface can be improved, it is first necessary to understand how the shape of the top surface affects the light emission pattern and hence crystal decoding. As mentioned above, the poor decoding of the edge scintillator elements result from the weak signals detected by photosensors that are diametrically opposed to a scintillation event, and these weak signals result from the fact that the emission pattern is weak along rays near the grazing angle. Although the radiation pattern inside a scintillator element is isotropic, the emission pattern from the surface of a scintillator element is somewhat directional. The exact emission pattern is specific to the geometry and material properties of the scintillator element and is not discussed here. However, for the case of an isotropic light source inside the scintillator element where the scintillator element has an index of refraction greater than the index of refraction of the surrounding medium, Fresnel reflections and Snell's Law dictate that the radiation pattern will be predominantly normal to the surface of the scintillator element, as shown by the radiation pattern depicted in FIGS. 1C and 3B. FIGS. 1C and 3B show notional radiation patterns for scintillation photons transmitted from the scintillator element top surfaces 112 and 312 respectively. The length and direction of the arrows indicate respectively the number and direction of the emitted photons.

Figure 4:
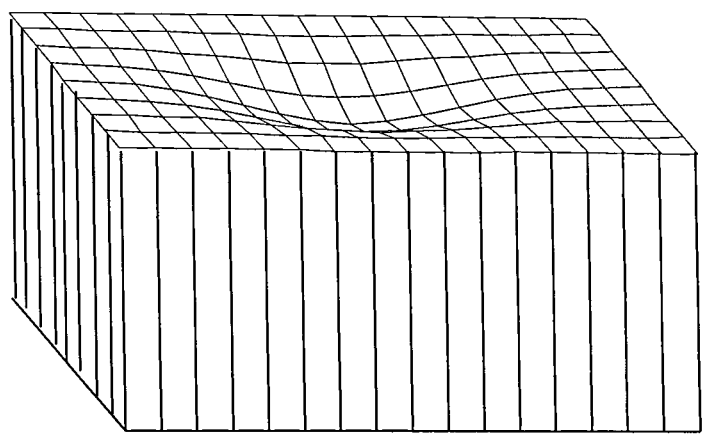
FIG. 4 is a perspective view of a scintillator module with a two-dimensional array of scintillator elements, where the top surfaces of the scintillator elements have been shaped to control the propagation direction of the scintillation photons and improve the centroid distribution across the flood map for the scintillator module.

In a conventional PET imaging system the scintillator elements have the shape of a right rectangular prism, as shown in FIGS. 1B and 1C. The bottom surface 114 of each scintillator element is parallel with the top surface 112, and the bottom surface 114 and top surface 112 of each scintillator element is parallel to the bottom and top surfaces for all the scintillator elements within the scintillator module 100. In the improved scintillator element 310 the top surface 312 is shaped to direct the radiation pattern more towards the center of all of the photosensors within the scintillator module 100. This improves light sharing among the photosensors, and crystal decoding is also improved. Crystal decoding is improved by varying the shapes of the top surfaces along the array of scintillator elements, in order to increase the distinctiveness of the relative photosensor signals among the various scintillator elements (e.g., increasing the separation between peak centroids in the flood map). Generally, this means that for a scintillator module where the top surfaces of the scintillator elements together form a continuous surface, as shown in FIG. 4, the corner and central scintillator elements will have top surfaces that are substantially parallel to the bottom surfaces—the top surface of the scintillator module having a generally concave shape. Any shape can be used as long as the top surface shape improves crystal decoding by increasing the distinguishability of scintillation event positions.

Figure 3A:
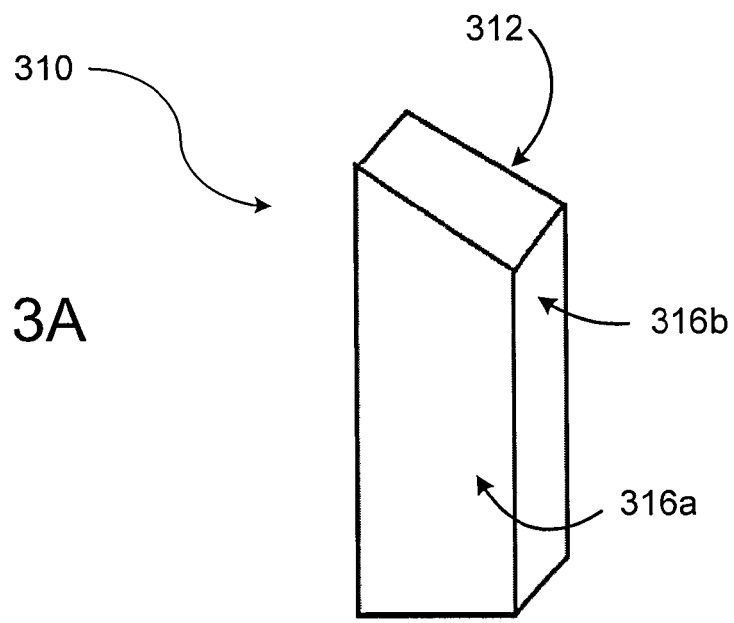
FIG. 3A is a prospective view a single scintillator element where the top surface is at an oblique angle to control the propagation direction of the scintillation photons.
Figure 3B:
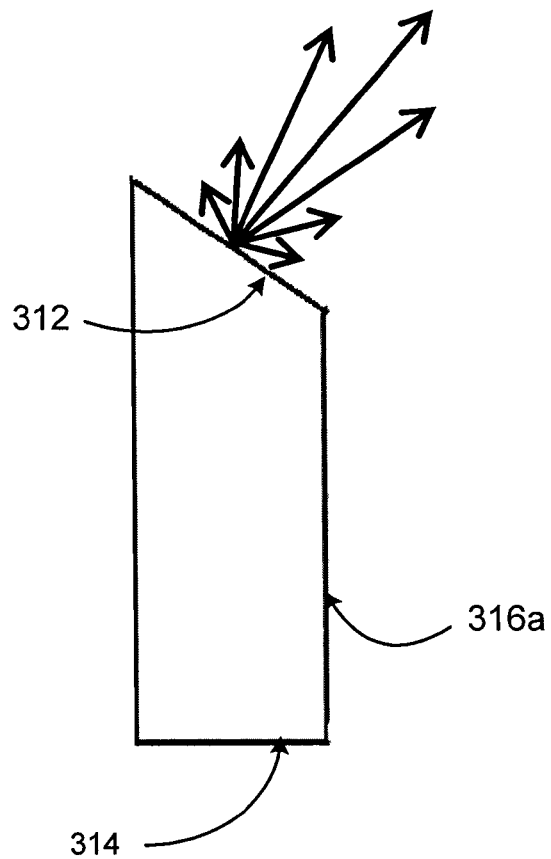
FIG. 3B is a side view of a scintillator element where the top surface is at an oblique angle, illustrating a notional radiation pattern for scintillation photons from the scintillator element.

FIGS. 3A and 3B show a scintillator element 310, where the top surface 312 is oblique relative to the bottom surface 314. As shown in FIG. 3B the radiation pattern for the scintillation photons has a peak around the ray normal to the top surface 312. By angling the top surface 312, the radiation pattern is steered to provide favorable light sharing among the photosensors. This is in contrast to conventional scintillator elements in which the radiation pattern is directed toward the photosensor immediately above the scintillator element. Additionally, angling the top surface 312 at an oblique angle increases exposure of the area of the top surface 312 to the photosensors. Because the photosensor signal is proportional to the foreshortened area of the top surface 312, as seen from the photosensor, increasing the area of the top surface 312 generally increases the signal to all photosensors, but especially increases the signal where the foreshortened area is substantially increased (i.e., where the top surface 312 is angled toward the photosensor).

As discussed above, the shape of the top surface 312 of scintillator element 310 controls the direction of the light emission pattern, and the radiation pattern controls the light sharing and the relative signal measured by each photosensor. It is possible to improve crystal decoding by optimizing the shape of the top surface of scintillator elements. By individually modifying the angle of the top surface for each scintillator element the centroid position of each scintillator element in the flood map can be individually tuned and optimized to improve crystal decoding.

FIG. 2B shows an example of a flood map of a scintillator module that has scintillator elements with shaped top surfaces to improve crystal decoding. In this example there are four photosensors corresponding to the four corners of the figure: upper-left, upper-right, lower-left, and lower-right. We focus the discussion on scintillator elements 20, 22, 24, and 26, which are all in the upper-left corner of the scintillator module. For the conventional scintillator module shown in FIG. 2A, the scintillator elements 20, 22, 24, and 26 emit most of their photons toward the upper-left photosensor and only a very small fraction of the scintillation photons are detected by the other three detectors. Thus, their respective centroids are grouped tightly together in the flood map.

To separate these centroids in the flood map shown in FIG. 2B, each of the scintillator elements 22, 24, and 26 is angled to direct more light towards the upper-right, lower-left, and lower-right photosensors, respectively. The separation between 20 and 22 can be increased by angling of the top surface of scintillator element 22 such that it faces more towards the upper-right photosensor, which pulls centroid 22 towards the upper-right corner of the flood map in FIG. 2B.

Similarly, centroid 26 can be moved towards the lower-right corner of the flood map by angling of the top surface of scintillator element 26 such that it faces more towards the lower-right photosensor. To move centroid 24 lower, the angle of the top surface of the scintillator element 24 is changed such that it faces more towards the lower-left photosensor.

In FIG. 2B small angles have been introduced to the top surfaces to improve crystal decoding. In FIG. 2C much larger angles have been introduced to the top surfaces of the scintillator elements in order to achieve a mostly uniform distribution of the centroids across the flood map. The oblique angle and facing direction of each single crystal is arranged according to the position symmetry of the array. The crystal decoding can be optimized by selecting the correct oblique angle and the facing direction. FIG. 4 shows a drawing of the optimized scintillator module corresponding to the flood map shown in FIG. 2C.

Different processes can be employed to find an acceptable shape for the top surfaces of the scintillator elements. For example, an acceptable shape could be found through experimentation using the cut-and-try method, or the shape could be found through numerical optimization using computational simulations of the light emission patterns, where the radiation pattern is simulated using one of the techniques of ray tracing, beam propagation, physical optics, etc.

In certain embodiments, as shown in FIG. 4, the top surface of the scintillator module will be smooth such that lateral surface heights are the same for adjoining lateral surfaces of neighboring scintillator elements. The shape of the top surface of the scintillator module may be a concave shape as shown in FIG. 4. In alternative embodiments, as shown in FIG. 5, neighboring scintillator elements will have adjoining lateral surfaces of different heights creating a saw tooth shape in some regions of the scintillator module. For example, in FIG. 5 a scintillator module 510 with shaped scintillator elements illuminates four photosensors 550, 552, 554, and 556. In certain embodiments, the shaped top surface of the scintillator module may be made from a separate optical material from the scintillating material, and the shaped part forming the top surface may be bonded to the scintillating material. In certain embodiments, the scintillating material may be one solid piece, and the scintillator elements will be pixels within the solid piece. In other embodiments, each scintillator element may be a separate piece, and the separate scintillator element may be held together using a bonding agent or filling material between the lateral surfaces of the scintillator element.

To reduce the cost of shaping the top surface of the scintillator elements, it may be desirable to make shaped parts out of a transparent optical material with a similar index of refraction to the index of refraction of the scintillating material. These shaped parts can be fabricated using the technique of injecting an optical polymer into a caste or mold. Also, these shaped parts can be fabricated by machining glass to form the shaped parts. The index of refraction for the shaped parts can be matched to the index of refraction the scintillating material in order to mitigate reflections at the boundary between the shaped parts and the scintillating material. The reflections at the boundary can also be mitigated by choosing an index-matching optical adhesive to bind the shaped parts to the scintillating material. Alternatively, the shaped parts can be bonded to the scintillating material using diffusion bonding so long as the crystal lattice of the shaped part and the scintillating material are similar. The diffusion bonding can be performed by preparing the surfaces to be bonded, e.g., by a plasma cleaning process under vacuum, then bring the surfaces into direct contact at high pressure and high temperature over a period of time allowing diffusion to take place between the two crystalline materials of the shaped part and the scintillator element.

Figure 6:
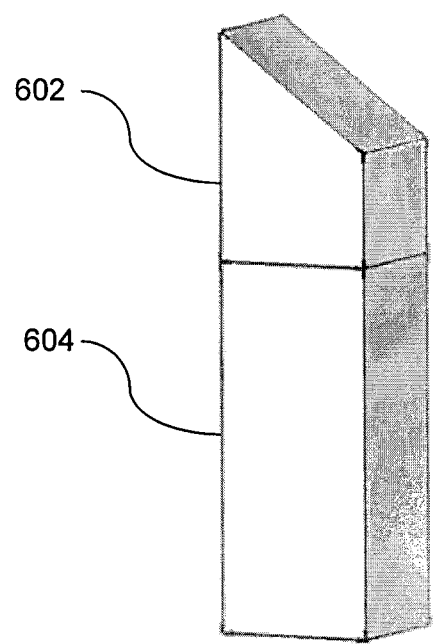
FIG. 6 illustrates a scintillator element where a scintillator crystal is joined with a prism of index matching material to form a scintillator element with a shaped top surface.

In certain embodiments, as shown in FIG. 6, each scintillator elements will include a scintillating part 604 and a shaped part 602. These shaped parts can be made by casting, machining, grinding and polishing, or other techniques for making optical parts. These shaped parts are then bonded to the top surfaces of the scintillating part, where the scintillating parts are right rectangular prisms. The bonding agent to bond the shaped parts to the scintillating crystal can be a UV curing epoxy, etc.

In certain embodiments the light coupling out of the scintillator elements can be improved by including on the top surface of the scintillator elements an anti-reflection coating. The anti-reflection coating can be an optical coating of one or more thin layers, less than the optical wavelength, of dielectric material deposited on the top surface of the scintillator elements. In certain embodiments the anti-reflection coating can be chosen to decrease reflections over a wide range of optical wavelengths and incident angles to increase the transmission of scintillation photons through on the top surface of the scintillator elements.

In certain embodiments the top surface of the scintillator elements can be curved. In alternative embodiments the top surface of each scintillator element will be a plane and the oblique angle of the top surface relative to the bottom surface of each scintillator element will depend on its location within the scintillator module. The oblique angles will be chosen such that the angle improves crystal decoding.

In certain embodiments, the scintillator elements may be arranged in a two-dimensional array and spaced from the a neighboring scintillator elements such that the lateral surfaces of the scintillator elements do not directly contact the lateral surfaces of the neighboring scintillator elements. This volume between the lateral surfaces of the scintillator elements can be filled with a filling material such as an adhesive.

In certain embodiments the filling material will have an index of refraction that is lower than the index of refraction of the scintillator element. A larger difference between the index of refraction of the filling material and the index of refraction of the scintillator elements will increase the Fresnel reflections from the lateral surfaces of the scintillator elements preventing the scintillation photons from coupling out of their original scintillator element.

In an alternative embodiment the filling material may include a reflective material. This reflective material would accomplish the same goal of preventing scintillation photons from escaping through the lateral surfaces of the scintillator element. For example, the filling material may include reflective film elements.

While certain embodiments have been described, these embodiments have been presented by way of example only, and are not intended to limit the scope of the inventions. Indeed, the novel methods, apparatuses and systems described herein may be embodied in a variety of other forms; furthermore, various omissions, substitutions and changes in the form of the methods, apparatuses and systems described herein may be made without departing from the spirit of the inventions. The accompanying claims and their equivalents are intended to cover such forms or modifications as would fall within the scope and spirit of the inventions.

The invention claimed is:

1. A radiation detector, comprising:
   a plurality of photosensors arranged to receive light emitted from a plurality of scintillator elements; and
   the plurality of scintillator elements arranged in an array, wherein each of the plurality of scintillator elements has a bottom surface facing away from the plurality of photosensors and a top surface opposed to the bottom surface, wherein the top surface of each scintillator element has a shape that varies in accordance with a position of the scintillator element within the array.

2. The detector according to claim 1, wherein the top surface of each of the plurality of scintillator elements is a plane.

3. The detector according to claim 1, wherein the top surface of each of the plurality of scintillator elements is oriented at a predefined oblique angle relative to the bottom surface.

4. The detector according to claim 1, further comprising an anti-reflection coating on the top surface of each of the plurality of scintillator elements to promote light emission from the top surface of the each of the plurality of scintillator elements.

5. The detector according to claim 1, further comprising a filling material between a plurality of lateral surfaces of the plurality of scintillator elements.

6. The detector according to claim 5, wherein the filing material has an index of refraction less than the index of refraction of the scintillator elements.

7. The detector according to claim 5, wherein the filing material includes a reflective film element configured to reflect light incident on the plurality of lateral surfaces.

8. The detector according to claim 1, wherein
   each of the plurality of scintillator elements includes a scintillator part and a shaped part;
   the scintillator part includes a scintillator material shaped into a right rectangular prism and arranged such that a bottom surface of the scintillator part is the bottom surface of the scintillator element; and
   the shaped part includes a transparent optical material, the shaped part being arranged such that a bottom surface of the shaped part is fixed to a top surface of the scintillator part, and a top surface of the shaped part is shaped to control a distribution of the light from the scintillator part to the photosensors.

9. The detector according to claim 8, wherein the index of refraction of the shaped part matches the index of refraction of the scintillator part.

10. The detector according to claim 9, wherein an optical adhesive with an index of refraction matching the index of refraction of the scintillator part fixes the top surface of the scintillator part to the bottom surface of the shaped part.

11. The detector according to claim 8, wherein diffusion bonding fixes the top surface of the scintillator part to the bottom surface of the shaped part.

12. The detector according to claim 8, wherein the shaped part is a casted optical polymer.

13. The detector according to claim 8, wherein the shaped part is a machined glass part.

14. The detector according to claim 1, wherein the plurality of top surfaces of the scintillator elements together comprise a smooth continuous surface.

15. The detector according to claim 1, wherein the plurality of top surfaces of the scintillator elements together comprise a surface with at least one discontinuity at the boundary between a first scintillator element and a second scintillator element.

16. The detector according to claim 1, wherein the shape of the top surface of each of the scintillator elements is configured to provide a distribution of light emitted from the top surface of the plurality of scintillator elements such that a plurality of peak centroids of the respective plurality of scintillator elements will be evenly dispersed in a flood map of the detector.

17. The detector according to claim 3, wherein the oblique angle of the top surface of each of the scintillator elements is predetermined such that a plurality of peak centroids of the respective plurality of scintillator elements will be evenly dispersed in a flood map of the detector.

18. The detector according to claim 3, further comprising an anti-reflection coating on the top surface of each of the plurality of scintillator elements to promote light emission from the top surface of the each of the plurality of scintillator elements.

19. A radiation detector, comprising:
    a plurality of photosensors arranged to receive light emitted from a scintillator module; and
    the scintillator module having a bottom surface facing away from the plurality of photosensors, and a top surface opposed to the bottom surface, wherein the top surface has a shape that varies by position across an entirety of the top surface of the scintillator module to control sharing of the light emitted from the scintillator module and received by the photosensors.

20. The detector according to claim 19, wherein
    the scintillator module comprises a scintillator part and a shaped part;
    the scintillator part comprises a material that absorbs radiation and emits photons, the scintillator part having a bottom surface facing away from the plurality of photosensors, a top surface opposed to the bottom surface, and the bottom surface of the scintillator part is parallel to the top surface of the scintillator part; and the shaped part comprises an optically transparent optical material with a top surface and a bottom surface, the bottom surface of the shaped part fixed to the top surface of the scintillator part, and the top surface of the shaped part is the top surface of the scintillator module.

21. The detector according to claim 19, further comprising an anti-reflection coating on the top surface of the scintillator module.

22. A radiation imaging apparatus, comprising:

a plurality of scintillator detectors arranged to receive radiation from an image source, wherein each scintillator detector comprises a plurality of photosensors arranged to receive light emitted from a plurality of scintillator elements;

the plurality of scintillator elements arranged in an array, wherein each of the plurality of scintillator elements has a bottom surface facing away from the plurality of photosensors and a top surface opposed to the bottom surface, wherein the top surface of each scintillator element has a shape that varies in accordance with a position of the scintillator element within the array; and circuitry configured to receive signals from the plurality of scintillator detectors and to calculate positions of scintillation events using relative magnitudes and timing of the received signals.

23. A PET imaging system, comprising:

a plurality of scintillator detectors arranged to receive radiation from an image source, wherein each scintillator detector comprises a plurality of photosensors arranged to receive light emitted from a plurality of scintillator elements;

the plurality of scintillator elements arranged in an array, wherein each of the plurality of scintillator elements has a bottom surface facing away from the plurality of photosensors and a top surface opposed to the bottom surface, wherein the top surface of each scintillator element has a shape that varies in accordance with a position of the scintillator element within the array; and circuitry configured to receive signals from the plurality of scintillator detectors and to calculate positions of scintillation events using relative magnitudes and timing of the received signals.

* * * * *